Apr. 17, 1923.
H. A. CALAHAN
1,452,065
AUTOMOBILE LOCK PROTECTIVE DEVICE
Filed Nov. 19, 1921
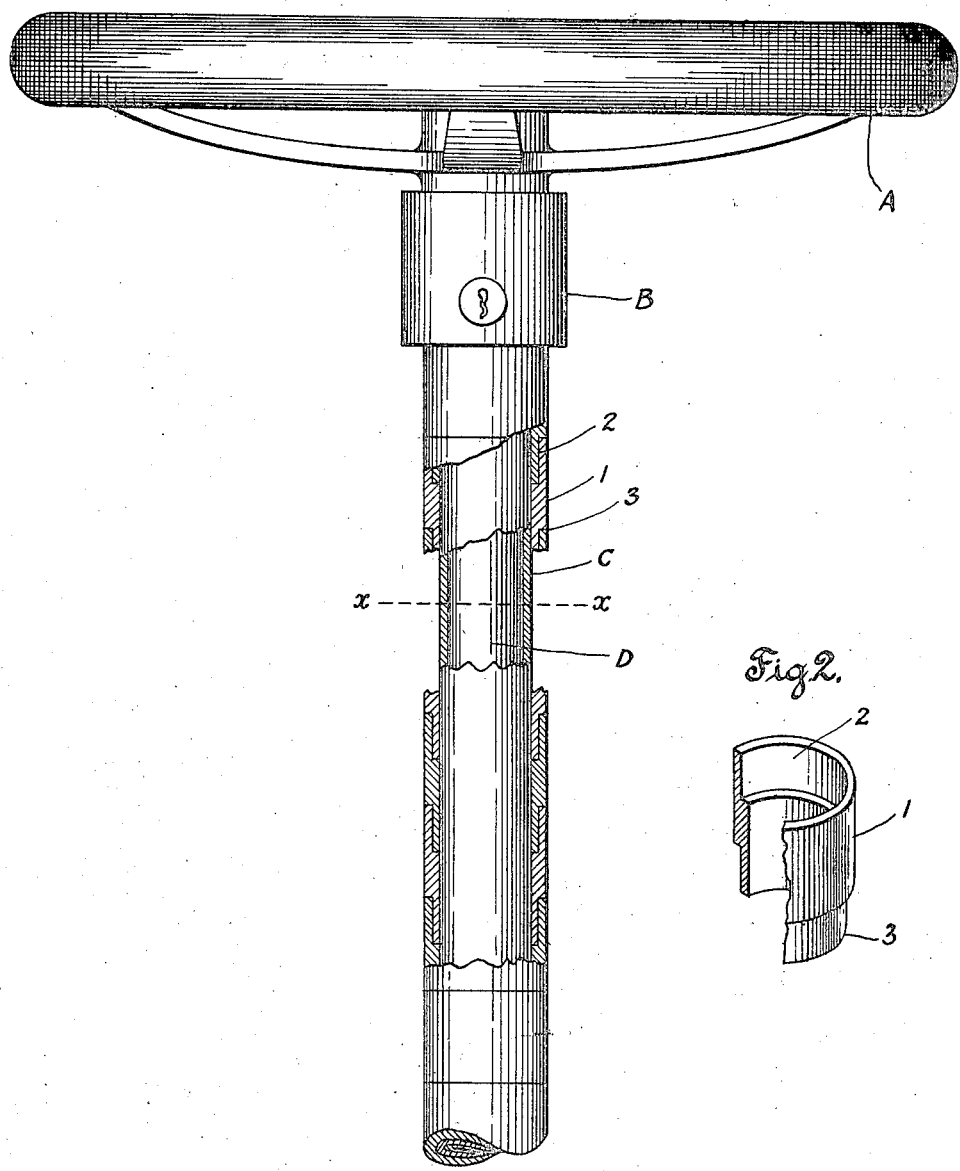
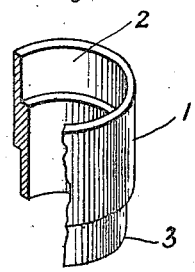
INVENTOR
Harold A. Calahan
BY Wm Wallace White
ATTORNEY Patented Apr. 17, 1923.

1,452,065

UNITED STATES PATENT OFFICE.

HAROLD AUGUSTIN CALAHAN, OF NEW YORK, N. Y.

AUTOMOBILE LOCK PROTECTIVE DEVICE.

Application filed November 19, 1921. Serial No. 516,272.

*To all whom it may concern:*

Be it known that I, HAROLD A. CALAHAN, a citizen of the United States of America, residing at 150 West 104th Street, city, county, and State of New York, U. S. A., have invented new and useful Improvements in Automobile Lock Protective Devices, of which the following is a specification.

This invention relates to protective devices for automobile locks.

Particularly the invention relates to that type of automobile lock in which the steering wheel or the inner column to which it is attached is locked to the fixed member of the steering column, which in ordinary practice is tubular in form and fixed at some point of its length and encloses a movable inner member secured to the steering wheel at its upper end. In such devices it has been found that by the use of a pipe cutting tool the outer member of the steering column may be cut below the lock so that notwithstanding the fact that the steering wheel has been locked to the upper portion of the outer member of the steering column when the outer member thereof is cut the vehicle to which the device is attached may be readily steered in the ordinary way.

Therefore, the specific object of the invention is to place around the outer member of the steering column a protective device, made preferably of hardened material and of a plurality of sections so arranged that they readily rotate and resist cutting by the use of the ordinary pipe cutting tool, or other cutting tool.

It is not the object of this invention to provide any new form of automobile lock but the object is to render effective the known forms of locks now sold on the market.

In the accompanying drawings, forming part hereof, is illustrated a form of embodiment of the invention, in which drawings similar reference characters designate corresponding parts, and in which:

Figure 1 is an elevation, partly broken away and partly in vertical section of a common form of automobile steering apparatus showing the application of the invention; and Figure 2 is a perspective view, partly broken away of one of the elements forming the protective device of the invention.

Referring to the drawings A designates a steering wheel, which by means of any common form of automobile lock B is secured to the upper end of the outer tubular member C of the steering column. In ordinary practice the outer member C is secured at its lower end to the vehicle of which it forms a part.

A second tubular member D is disposed so as to rotate inside of the outer tubular member C and has its upper end permanently secured to the steering wheel A and its lower end connected with the steering apparatus on the chassis of the vehicle to which it is attached.

Under ordinary conditions if a pipe cutting tool or other instrumentality is used and the outer fixed member C of the steering column is cut along the line X—X for example, notwithstanding the fact that the lock B secures the steering wheel A to the outer member C the wheel may be rotated and the vehicle steered.

In order to render effective the locking of the steering wheel A, through the medium of the lock B, to the fixed portion C of the steering column a plurality of rings 1 are disposed over the outside of the fixed member C. These rings 1 are made preferably of very hard material and of a width so narrow that they cannot be held by one implement and cut by another. Further, the rings 1 are of such internal diameter that they readily turn on the fixed member C of the steering column so that if a cutting tool is used thereon the rings 1 will turn and afford no gripping surface for the cutting tool.

In order to present a continuous surface the rings 1 at one end have an enlarged internal diameter 2 and at the opposite end a reduced external diameter 3, so they fit one into the other.

In order that the rings 1 may not be gripped by one implement so as to be held under the operation of another cutting implement they are made relatively short, the detail in figure 2 being rather enlarged.

Having thus fully described my invention what I claim is new and desire to secure by Letters Patent is:

1. In combination with the steering column of an automotive vehicle, a protective covering disposed around the steering column.

2. In combination with the steering column of an automotive vehicle, a protective covering loosely disposed around the steering column.

3. In combination with the steering column of an automotive vehicle a protective covering comprising a plurality of members disposed around the steering column.

4. In combination with the steering column of an automotive vehicle a protective covering comprising a plurality of interlocking members disposed around the steering column.

5. In combination with the steering column of an automotive vehicle, a protective covering comprising a loosely disposed element around the steering column.

6. In combination with the steering column of an automotive vehicle a protective covering comprising a plurality of loosely disposed interlocking elements disposed around the steering column.

7. An element for a protective device for steering columns comprising an open ended ring.

8. An element for protecting a steering column comprising a ring having a reduced external diameter at one end and an enlarged internal diameter at its opposite end.

In testimony whereof I have signed my name to this specification.

HAROLD AUGUSTIN CALAHAN.